United States Patent
Bhagchandani et al.

(10) Patent No.: US 10,956,631 B2
(45) Date of Patent: Mar. 23, 2021

(54) DISTRIBUTION SELECTION AND SIMULATION OF INTERMITTENT DATA USING MACHINE LEARNING (ML)

(71) Applicant: ACCENTURE GLOBAL SOLUTIONS LIMITED, Dublin (IE)

(72) Inventors: Hitesh Bhagchandani, Bangalore (IN); Arvind Maheswaran, Bangalore (IN); Abhijit Kumar, Bangalore (IN); Rajarajan Thangavel Ramalingam, Bangalore (IN); Siddhartha Chakravarty, Kolkata (IN); Neha Kagwad, Bangalore (IN); Renuka R. Jogade, Bangalore (IN); Mahadevaswamy Basavanna, Nanjangud (IN); Sunny Balani, Gurgaon (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 385 days.

(21) Appl. No.: 16/164,439

(22) Filed: Oct. 18, 2018

(65) Prior Publication Data
US 2020/0074020 A1    Mar. 5, 2020

(30) Foreign Application Priority Data
Aug. 31, 2018  (IN) .............................. 201811032722

(51) Int. Cl.
G06F 30/20     (2020.01)
G06F 17/18     (2006.01)
(Continued)

(52) U.S. Cl.
CPC .............. *G06F 30/20* (2020.01); *G06F 17/18* (2013.01); *G06N 20/00* (2019.01); *G06F 2111/10* (2020.01)

(58) Field of Classification Search
None
See application file for complete search history.

(56) References Cited

U.S. PATENT DOCUMENTS 4,220,833 A *  9/1980  Wert .................... H04B 17/407
                                                           370/243
8,010,324 B1    8/2011  Crowe et al.
(Continued)

OTHER PUBLICATIONS

Haukoos et al., "Advanced statistics: bootstrapping confidence intervals for statistics with "difficult" distributions", Nov. 1, 2004, 7 pages.

*Primary Examiner* — Craig C Dorais
(74) *Attorney, Agent, or Firm* — Mannava & Kang, P.C.

(57) ABSTRACT

A machine learning (ML) based intermittent data processing system accesses a collection of intermittent data points, determines a data distribution associated with the collection and generates one or more calculated values based on the data distribution. A simulation can be employed to determine the accuracy of the calculated values based on which, the calculated values can be employed for further processing. The collection of intermittent data points is initially processed to determine if one or more of the data distribution identification, bootstrapping or variability capping techniques are to be applied in order to obtain the calculated values. The calculated values are used to generate visualizations and recommendations.

20 Claims, 12 Drawing Sheets

(51) Int. Cl.
*G06N 20/00* (2019.01)
*G06F 111/10* (2020.01)

(56) References Cited

U.S. PATENT DOCUMENTS

| | | | |
|---|---|---|---|
| 10,748,072 B1 * | 8/2020 | Seeger | G06N 7/005 |
| 2019/0022492 A1 * | 1/2019 | Takahashi | G06F 17/18 |

* cited by examiner

DISTRIBUTION SELECTION AND SIMULATION OF INTERMITTENT DATA USING MACHINE LEARNING (ML)

PRIORITY

The present application claims priority under 35 U.S.C. 119(a)-(d) to the Indian Non-Provisional Patent Application Serial No. 201811032722, having a filing date of Aug. 31, 2018, the disclosure of which is hereby incorporated by reference in its entirety.

BACKGROUND

Intermittent data includes data series wherein data points seemingly appear sporadically so that certain time intervals with data points are interspersed with intervals where no data points are seen. For example, demand data for certain products such as seasonal products, spare parts, consumer durables etc. can follow intermittent patterns. Demand data for seasonal items may be intermittent but can yet follow a pattern based on the seasons. However, certain demand data can exist which is characterized by data series that may not appear to follow any patterns. Methods for managing intermittent data series need to be explored in order to understand and use the available intermittent data in various situations.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
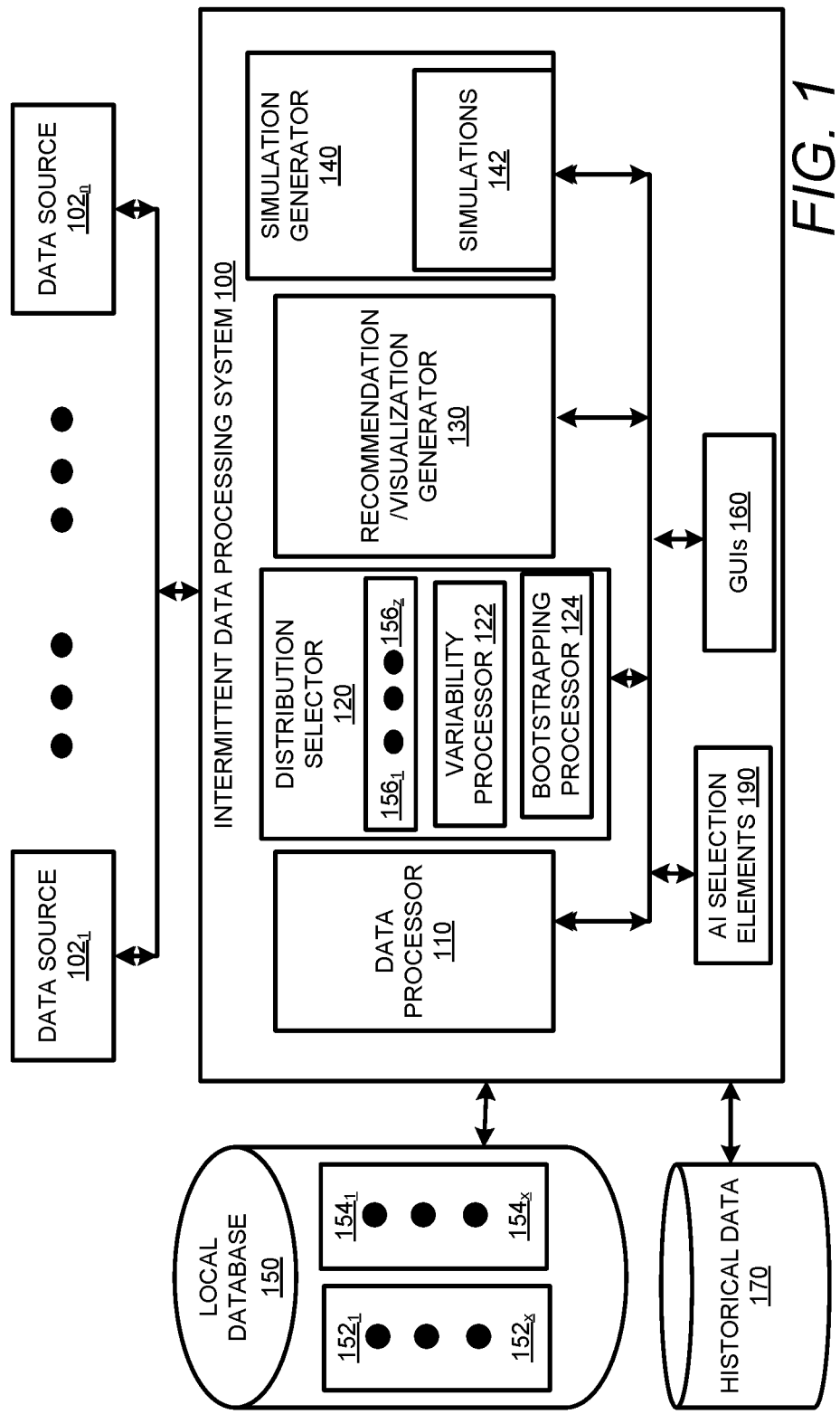
FIG. 1 is a block diagram that shows an intermittent data processing system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A machine learning (ML) based intermittent data processing system receives intermittent data such as intermittent demand data from a plurality of sources, determines a data distribution to be used for the intermittent data, calculates values therefrom, generates simulations based on such calculated values and tests the calculated values through some criteria like SLA norms. Different processing techniques can be applied based on the based on the calculated values meeting certain criteria. If the values meet criteria then data distribution identification and/or bootstrapping techniques can be applied. If the values don't meet the criteria, then variability capping techniques will be applied.

The received intermittent data is initially processed for cleaning, deduping etc. and smoothened to obtain continuous data. In an example, the intermittent data includes data points at irregular intervals. Techniques such as but not limited to, the Croston method are employed in the data smoothening. Standard deviation values are obtained from continuous data that is received upon smoothening. The continuous data can include data points at regular intervals. The continuous data is subjected to a distribution fitting test in order to determine a data distribution that forms a good fit. In an example, data distribution fitting tests such as but not limited to, AI based Decision Trees, ML-based Chi square test or Anderson-Darling test are used. Based on the output of the test, one of the data distributions can be selected as a good fit for the continuous data.

In case none of the data distributions is selected for the continuous data, bootstrapping techniques can be employed. The continuous data is sampled and one of the data distributions is used to obtain calculated values from the continuous data. The calculated values can be displayed to the user via various visualizations. In an example, simulations can be developed for example, via estimating statistical projections of the calculated values using the selected data distribution based formulae. Simulations allow testing of validity of estimates in multiple scenarios depicting real-world data distributions of intermittent data. The visualizations can include the calculated values and simulations that can be used to determine the accuracy of the calculated values.

In one example, if the calculated values after simulation from data distribution and bootstrapping approaches don't meet a certain criteria, a variability capping methodology can be employed in order to obtain the optimal calculated values. The variability capping methodology can include obtaining standard deviation (SD) of the data set and varying the SD of the data set in predetermined increments (e.g., 10% increments) to obtain hypothetical SD values for the data set. The hypothetical SD values are then employed to obtain hypothetical distributions corresponding to each of the SD values. In an example, one or more of the normal distribution or Poisson distribution or indeed any other distribution that has been selected as a good fit for the data set can be used to generate the hypothetical distributions. Hypothetical calculated values are obtained from the hypothetical distributions. The simulations which are generated based on the hypothetical calculated values can be used to determine whether the optimal hypothetical calculated values are obtained. Based on the observations/output of the simulations, the SD values can be incrementally varied (e.g., in steps of 10% each) until the optimal hypothetical calculated values that satisfy the SLA norms are identified.

In an example, the data generated for or during the intermittent data analysis processes outlined above can be stored as historical data and used to train Artificial Intelligence (AI) based selection elements such as but not limited to decision trees. The AI-based elements can be trained to identify which of the approaches outlined above will be suitable for a given data set. Therefore, the data distribution for the given data set can be directly identified by the AI selection elements thereby expediting the process of obtaining the calculated values and obtaining the visualizations/recommendations.

Generally intermittent data such as, intermittent demand data, is observed when products are sold at sporadic intervals with no periodicity. Therefore, there can be intervals of demand corresponding to the data points of the intermittent data followed by periods of zero demand. The many zero values in the intermittent data makes it difficult to analyze the data and obtain the calculated values. Another difficulty in analyzing intermittent data includes the fact that sparse and sporadic occurrence of data points in the data set make it difficult to determine the patterns or the data distributions. Accordingly, several years or even decades of data may become necessary before a data pattern or data distribution is identified for a given intermittent data set. Certain examples can exist where a data pattern cannot be identified. Examples disclosed herein enable various technical advantages addressing the aforementioned issues with the analyzing intermittent data. In an example, the intermittent data processing system enables analysis of the intermittent data by determining a data distribution for a given set of intermittent data by using the distribution fitting test and using bootstrapping techniques if no data distribution can be determined. Furthermore, methodologies are disclosed that enable identifying the optimal calculated values that are to be obtained based on given process rules.

In an example, the data distribution identification techniques disclosed herein can be employed for inventory optimization for goods such as consumer durables, spare parts of machinery etc. that have fairly long usable life after purchase. As a result, intermittent demand can be often observed for such goods and inventory optimization is needed for proper inventory maintenance of raw materials, intermediate products and finished goods. The techniques disclosed herein enable not only smoothing the intermittent data but also identifying a data distribution that is a good fit for the smoothened data via applying the distribution fitting test. The resulting calculations and demand projections are therefore more accurate than what would otherwise be produced in the absence of the data distribution fitting testing and the resulting analysis. Hence, the examples disclosed herein enable technical effects of producing more accurate simulations and projections within systems such as those for inventory optimizations.

FIG. 1 is a block diagram that shows an intermittent data processing system 100 in accordance with examples disclosed herein. The intermittent data processing system 100 includes a data processor 110, a distribution selector 120, a recommendation/visualization generator 130 and a simulation generator 140. The intermittent data processing system 100 can be connected to a plurality of data sources $102_1 \ldots 102_n$ (n being a natural number) from where different collections of intermittent data points $152_1 \ldots 152_x$ (x being a natural number) are received for analysis and processing. The intermittent data processing system 100 further includes various GUIs 160 that enable receiving data from a user and displaying results to the user. At various points in the description of the intermittent data processing system 100 herein, examples can be described referring to an inventory optimization system which can employ the intermittent data processing system 100 disclosed herein. It can be appreciated that the reference to the inventory optimization system is only by the way of illustration and that the data distribution selection and other intermittent data processing techniques disclosed herein can be applied in other use case scenarios. In an example, the inventory optimization system can collect the intermittent demand data needed for processing directly from sources such as Enterprise Resource Planning (ERP) systems or from a secure file transfer protocol (SFTP) locations. In another example, the data can be uploaded to the inventory optimization system via Alteryx platform or Alteryx can automatically extract the data from the ERP systems. The process rules and data transformation can be implemented on Alteryx platform, later the data can be stored in the local database 150.

Each of the collections of intermittent data points $152_1 \ldots 152_x$ can represent data points that occur infrequently and/or at irregular intervals. Referring to the inventory optimization example, each of the collections of intermittent data points $152_1 \ldots 152_x$ can represent demand data of a product as represented by its SKU. In the case of the inventory optimization, the input data can also include but is not limited to descriptions, issuances, usage/demand, unit costs, inventory classification, inventory segments, re-order quantity (ROQ) rules, economic order quantity (EOQ) inputs (ordering cost, holding cost etc.), average order quantity (AOQ) inputs (coverage months), maximum retail price (MRP), lot size types, segment strategies (Stock, not stock), inventory locations and service level agreements (SLA) norms for SKUs/segments. Economic Order Quantity (EOQ) is a production formula used to determine the most efficient amount of goods that should be purchased based on ordering and carrying costs. In an example, the collections of intermittent data points $152_1 \ldots 152_x$ can be generated via inventory consolidation that includes segment-wise snapshots of an inventory and snapshots of non-moving SKUs The data for each of the collections of intermittent data points $152_1 \ldots 152_x$ is smoothened in order to convert the intermittent data points of a collection e.g., $152_1$ into a continuous distribution of data points in accordance with the techniques disclosed herein. The following examples discuss the analysis of one of the collections of intermittent data points e.g. $152_1$ for illustration purposes. It can be appreciated that other collections of intermittent data points e.g. $152_2 \ldots 152_x$ can be similarly processed. The output from the data processor 110 includes smoothened data in the form of collections of continuous data points $154_1 \ldots 154_x$ that respectively correspond to the collections of intermittent data points e.g. $152_1 \ldots 152_x$. In an example, the collections of continuous data points $154_1 \ldots 154_x$ can be stored in a local database 150 of the intermittent data processing system 100. The data processor 110 can be further configured to estimate a standard deviation (SD) for each of the collections of continuous data points $154_1 \ldots 154_x$ prior to further analysis in order to enable further analysis of the intermittent data collections $152_1 \ldots 152_x$ in accordance with the methodologies discussed herein.

The distribution selector 120 selects one of the collections of continuous data points e.g., $154_1$ for further analysis in order to identify or fit the collection of the continuous data points to one of a plurality of data distributions $156_1 \ldots 156_z$ (z being a natural number). In an example, the data distributions can include the normal distribution, the Poisson distribution, the gamma distribution, the negative binomial distribution and the like. As mentioned above, it is difficult to fit the collections of intermittent data points $152_1 \ldots 152_x$ pertaining to items for which demand is not related to inventory decisions for any other item held in stock such as maintenance repair and operating (MRO) supplies to specific data distributions due to the sparse data points within the collections of the intermittent data points $152_1 \ldots 152_x$.

The distribution selector 120 can execute a distribution fitting test in order to determine one of the plurality of data distributions $156_1 \ldots 156_z$ forms a good fit for the collection of continuous data points $154_1$. For example, normal distribution provides a good representation of data sets having moderate to high data elements. Accordingly, for the inventory optimization example, some of the material numbers/SKUs which have continuous demand points can fall in to normal distribution category. Similarly, Poisson distribution provides a good representation of data sets having very low volume and sporadic data elements. Turning again to the inventory optimization example, some of the material numbers which have sporadic demand points fall in to Poisson distribution category.

The distribution selector 120, upon executing the distribution test, may employ one of a variability processor 122 or a bootstrapping processor 124 for the analysis based on the distribution fitting or calculated values meeting certain criteria. For those where distribution does not fit well, the bootstrapping processor 124 can be used. On the other hand, if calculated values after simulation from above methods do not meet the criteria, then a variability processor 122 can be selected for further analysis. In an example, only one of the variability processor 122 or the bootstrapping processor 124 can be used for the intermittent data analysis.

The variability processor 122 estimates an initial standard deviation value for the given collection of data points $152_1/154_1$. Based on one of distributions selected by the distribution fitting test, the variability processor 122 can transmit the data to the visualization generator 130 to generate the calculated values. The calculated values thus obtained are checked for accuracy, using for example, the simulations 142 from the simulation generator 140. If the calculated values have sufficient accuracy then, further processing as detailed herein can occur based on the particular use case scenario. In the inventory optimization example, the calculated values such as safety stock, ROP, ROQ etc. can be employed to determine the SLA norms. If the calculated values from the initial standard deviation are determined to be inaccurate, based on the further processing, the initial SD value is varied by a predetermined percentage e.g., 10%. The steps of obtaining the calculated values and determining the accuracy of the calculated values based on the further processing are repeated. Again, if the calculated values are determined to be inaccurate, then the SD value is varied by another 10%. The process is thus iteratively continued until accurate calculated values are obtained. In an example, the SD value variation can be capped at a variability capping limit, such as 250%-400% of the initial SD value. The SD value that gives the most accurate results within the capped limit can be selected.

In an example, none of the plurality of data distributions $156_1 \ldots 156_z$ may form a good fit for the collection of continuous data points $154_1$. In such instances, the distribution selector 120 employs the bootstrapping processor 124 which employs bootstrapping techniques to obtain one or more calculated values of the collection of continuous data points $154_1$ in a rule-based distribution free approach. In an example, the distribution selector 120 can process the collection of continuous data points $154_1$ using each of the data distributions $156_1 \ldots 156_z$ check the accuracy of the calculated values in accordance with the methodologies detailed herein and identify the corresponding data distribution as representing the collection of continuous data points $154_1$.

The information regarding one of the plurality of data distributions $156_1 \ldots 156_z$ that is selected as a good fit for the collection of continuous data points $154_1$ or the bootstrapping techniques used to force fit the collection of continuous data points $154_1$ is transmitted to the recommendation/visualization generator 130. Based on the particular data distribution or the bootstrapping techniques employed for the collection of continuous data points $154_1$, one or more calculated values can be obtained from the collection of continuous data points $154_1$. Each of the data distributions can have the corresponding formulae for obtaining the calculated values. The calculated values thus obtained based on the different data distributions can be employed further in different applications/use case scenarios to obtain different results as mentioned herein.

Referring to the example of the inventory optimization process, the various data sources can pertain to the demand data sources and calculated values such as but not limited to re-order point (ROP) re-order quantity (ROQ), safety stock, the minimum inventory that can be maintained to meet the rules, the maximum inventory that can be maintained while meeting the cost requirements can be obtained by the recommendation/visualization generator 130. ROP is the level of inventory which triggers an action to replenish the inventory stock. It is a minimum amount of an item which a firm holds in stock, such that, when stock falls to this amount, the item must be reordered. The reorder quantity (ROQ) is the quantity of the order that is to be placed on a new purchase order for an item. Output visualization can be enhanced by Tableau dashboards. The dashboards can be interactive and may be customized per the users' requirements. Actionable insights obtained from the dashboards can improve the utility of the intermittent data processing system 100 to the users.

The calculated values thus obtained can be further employed to generate simulations by the simulation generator 140 in accordance with some examples disclosed herein. The simulation generator 140 can generate simulations 142 that project the use case scenarios. In the inventory optimization example, inventory simulation techniques can be used to create an annual ledger with the calculated inventory norms (i.e. the calculate values) to calculate operations metrics such as fill rate, safety stock hit rate, out of stock metrics and compare them with the set/expected targets. The simulation can be used to determine if the simulated demand meets the SLA norms. For example, based on the current data, the simulated ROP, ROQ, minimum and maximum inventory quantities can be verified to determine if the SLA norms are met. If yes, then the calculated values are confirmed else the calculated values are rejected.

In an example, the data generated during the processing of the intermittent data collections $152_1 \ldots 152_x$ can be stored as historical data 170 which can be used to train AI selection elements 190 such as decision trees. Decision tree approach such as Chi Automatic interaction detection technique (CHAIR), Classification Regression Techniques (CART) and the like can be used to identify the optimal parameters that are to be used in identifying if the distribution selector 120, bootstrapping processor 124 or the variability processor 122 are to be used. For example, the number of data points of the distribution, the SD of the distribution, the interval between two demand points can be parameters that are used to design the right approach for a given distribution. Referring to the inventory optimization system, if the demand distribution has more than two values and the lead time is less than 3 month and the interval between two demand points is 6-12 months then Poisson distribution is to be used. Thus the AI selection elements 190 can be used to frame rules which enable determining the right approach for a given collection of intermittent data points.

Figure 2:
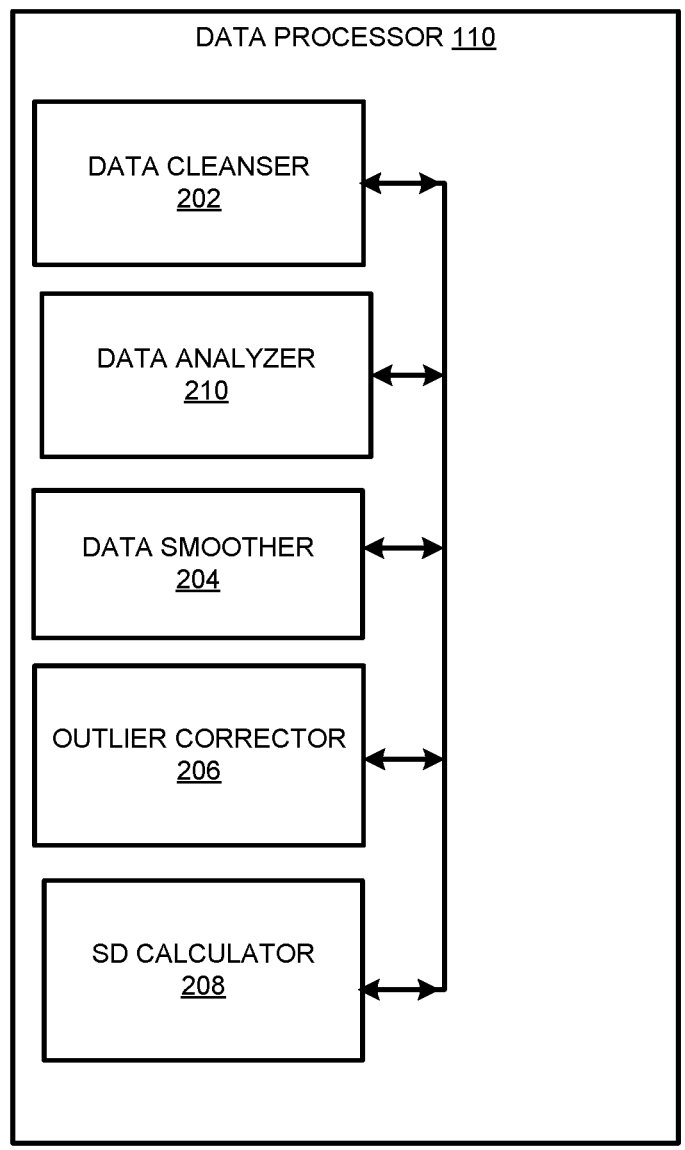
FIG. 2 shows a block diagram of a data processor in accordance with the examples disclosed herein.

FIG. 2 shows a block diagram of the data processor 110 in accordance with the examples disclosed herein. The data processor 110 includes a data cleanser 202, data smoother 204, an outlier corrector 206 and a SD calculator 208. The data cleanser 202 accesses the raw data from the plurality of data sources $102_1 \ldots 102_n$ and generates a cleansed data set which includes the collections of intermittent data points $152_1 \ldots 152_x$. The process of data cleanser 202 can be configured to detect and correct or remove corrupt or inaccurate records from a database. The data cleanser 202 can be further configured to execute, standardizing, normalizing, and de-duplicating the raw data to generate the collection of intermittent data points $152_1 \ldots 152_x$. In one example, one or more of the data smoother 204 and the outlier corrector 206 can be employed based on the output from a data analyzer 210. The data analyzer 210 can count the number of data points in a given collection of intermittent data points, compare them with the predetermined threshold to determine if one or more of the data smoother 204, outlier corrector 206 and SD calculator 208 is to be employed. If the number of intermittent data points exceeds the predetermined threshold, the data smoother 204 and the outlier corrector 206 can be employed, else the SD calculator 208 is employed. In an example, the SD calculator 208 can be used regardless of the number of data points in a given intermittent collection as SD can be useful in obtaining some of the calculated values in some use case scenarios detailed herein.

The collection of intermittent data points $152_1 \ldots 152_x$ are now further processed by the data smoother 204 for smoothening. The output of the data smoother 204, in an example, can be the collection of continuous data points $154_1 \ldots 154_x$. Therefore, the outlier corrector 206 can be employed to transform the collections of intermittent data points $152_1 \ldots 152_x$ into the collection of continuous data points $154_1 \ldots 154_x$. In an example, the Croston method can be employed for smoothing. For example, if the collection of intermittent data $152_1 \ldots 152_x$ pertains to demand data, the Croston method includes initially obtained separate exponential smoothing estimates made of the average size of a demand and secondly the average interval between the demands is calculated which is then used as a model to predict future demand. Since, the Croston method is used to smoothen the data, different kinds of data points that would not otherwise be analyzed e.g., slow to very slow demand data can be analyzed by an inventory optimization system that adapts the methodologies of the intermittent data processing system 100.

The outlier corrector 206 detects outliers in the collections of continuous data $154_1 \ldots 154_x$ and employs various techniques for outlier correction. In an example, outliers can be data points that differ markedly from other data points of a set which can be detected by comparing the maximums and minimums to the set-based thresholds. The outlier correction can be carried out by one or more of Sigma, Inter Quartile Ranges (IQR), Cook's D and DFBETA methods. The SD calculator 208 is used to calculate SD for each of the collections of continuous data points $154_1 \ldots 154_x$. The SDs thus obtained are used in various processing methodologies as outlined herein.

Figure 3:
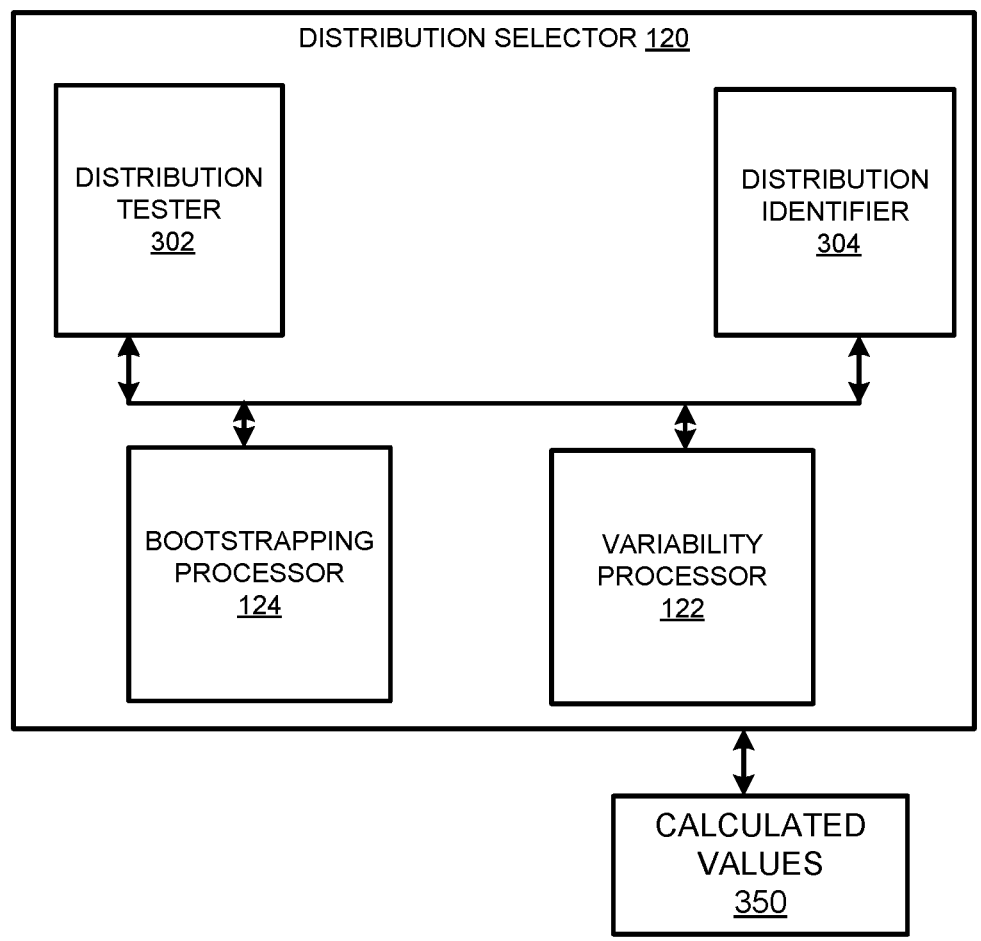
FIG. 3 shows a block diagram of a distribution selector in accordance with the examples disclosed herein.

FIG. 3 shows a block diagram of the distribution selector 120 in accordance with the examples disclosed herein. The distribution selector 120 includes a distribution fitting tester 302, a distribution identifier 304, a bootstrapping processor 124 and a variability processor 122. The distribution fitting tester 302 access the smoothened data including the collection of continuous data points $154_1 \ldots 154_x$ and employs a distribution fitting testing methodology for determining or selecting one of the plurality of data distributions $156_1 \ldots 156_z$ as a fit for the smoothened data. In an example, a Chi square test can be performed. In an example, Anderson Darling test can be performed. In an example, AI based Decision trees can be used. The Chi square test in one example, outputs certain values calculated from the collection of continuous data points $154_1$. Based on the ranges of the outputs from the Chi square test one of the plurality of data distributions $156_1 \ldots 156_z$ is identified as a good fit for the continuous data points $154_1$. In an example, the plurality of data distributions $156_1 \ldots 156_z$ can include a normal distribution, a Poisson distribution, a negative binomial distribution and a Gamma distribution. In an example, the negative binomial distribution can be used to model very slow demand distributions or data collections with sparse data points over long intervals. The selected distribution can be provided to the recommendation/visualization generator 130 wherein the formula pertaining to the distribution are used to obtain one or more calculated values from the continuous data points.

If, based on the output of the distribution identifier 304, it is determined that none of the plurality of data distributions $156_1 \ldots 156_z$ can fit the collection of continuous data points $154_1$, the bootstrapping processor 124 can employ a default distribution for the collection of continuous data points $154_1$. In an example, the bootstrapping processor 124 employs the Poisson distribution as the default distribution for fitting to the collection of continuous data points $154_1$. In an example, the bootstrapping processor 124 generates multiple samples from the collection of continuous data points $154_1$.

The information regarding the selected data distribution and the samples obtained by the bootstrapping processor 124 can be provided to the recommendation/visualization generator 130. The recommendation/visualization generator 130 can be configured to apply the distribution based formula e.g., Poisson distribution to obtain at least one calculated value. Accordingly, multiple calculated values are obtained by applying the distribution based formulae to each of the samples. The multiple values can be aggregated to obtain one or more calculated values for the collection of continuous data points $154_1$. The aggregation can include averaging the values or selecting the median value and the like. The calculated values 350 thus obtained can be provided as a visualization via one of the GUIs 160.

In an example, if calculated values after simulation from the distributions including bootstrapping do not meet criteria then the variability processor 122 can be employed. The variability processor 122 receives the initial SD value of the collection of the continuous data points $154_1$ and varies the initial SD value in predetermined incremental quantities e.g., 10% until a preset variability threshold value is reached. In an example, at each iteration, a hypothetical data distribution of the type as determined by the distribution fitting test and corresponding to the calculated SD value of that step is obtained. The recommendation/visualization processor 130 is then employed to obtain the hypothetical calculated values based on the hypothetical data distribution. Further processing of the data collections is executed as determined by the particular use case scenario and the accuracy of the hypothetical values is determined via a simulation. The process is repeated until an accurate, hypothetical data distribution is identified or until the preset variability threshold is reached. If the preset variability threshold is reached and an accurate data distribution is not identified then such data collection can be discarded from further calculations as 'un-qualified'.

Figure 4A:
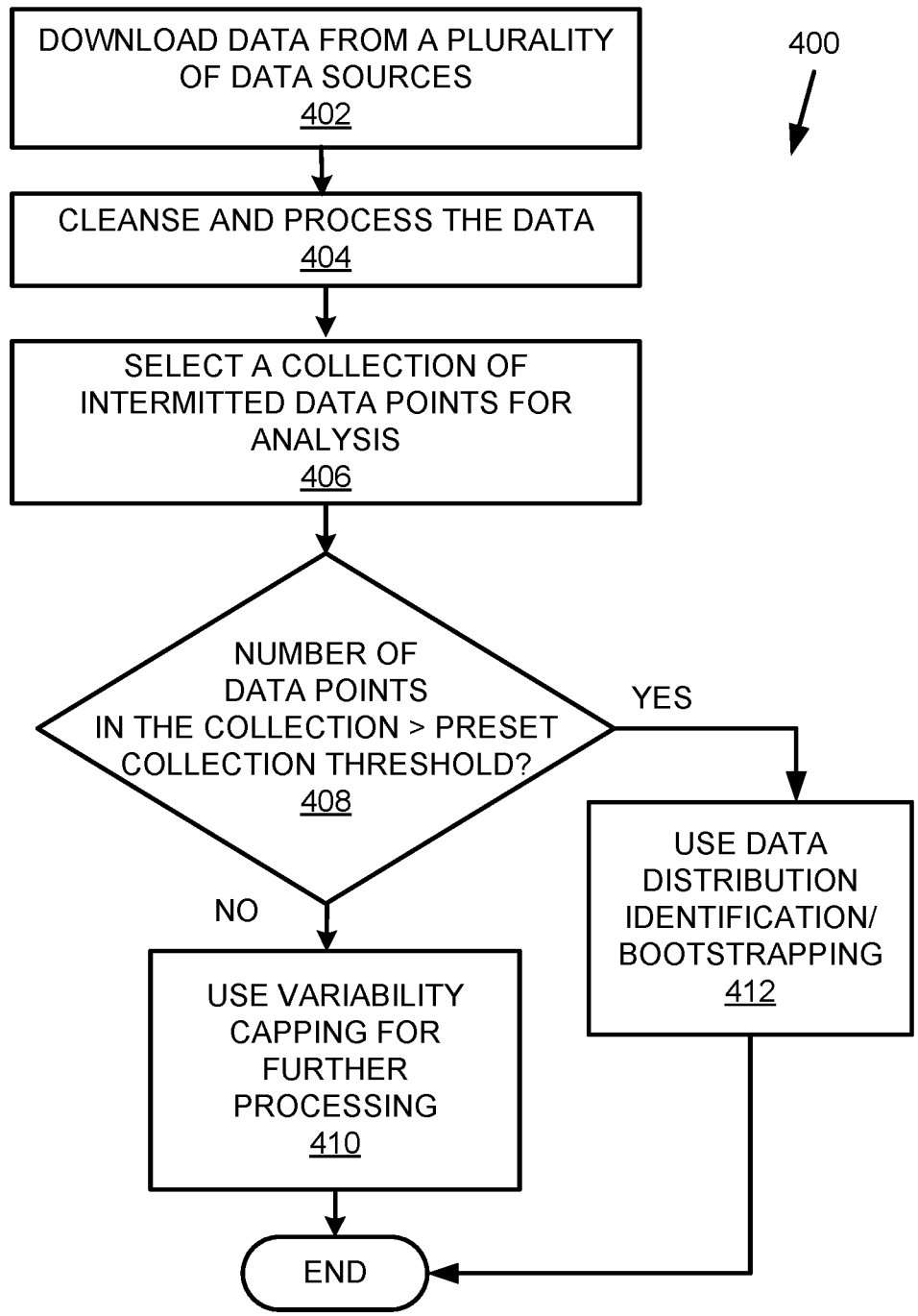
FIGS. 4A, 4B and 4C are flowcharts that detail methods of fitting a collection of intermittent data points to a data distribution in accordance with the examples disclosed herein.

FIG. 4A is a flowchart 400 that details a method of processing a collection of intermittent data points in accordance with the examples disclosed herein. The method 400 begins at 402 wherein collections of intermittent data points can be downloaded from a plurality of data sources $102_1 \ldots 102_n$. The downloaded data is cleansed and processed at 404 and one of the collection of calculated values from data distribution and bootstrapping is selected for analysis at 406. At 408, it is determined if the calculated values meet certain criteria. If it is determined at 408 that the calculated values meet the criteria, then the method moves to 412 wherein one or more of the data distribution identification and bootstrapping techniques are used for further processing of the intermittent data collection $152_1$. If it is determined at 408 that the calculated values do not meet criteria, then the method moves to 410 wherein variability capping techniques as described herein are employed for further processing of the collection of intermittent data points $152_1$.

Figure 4B:
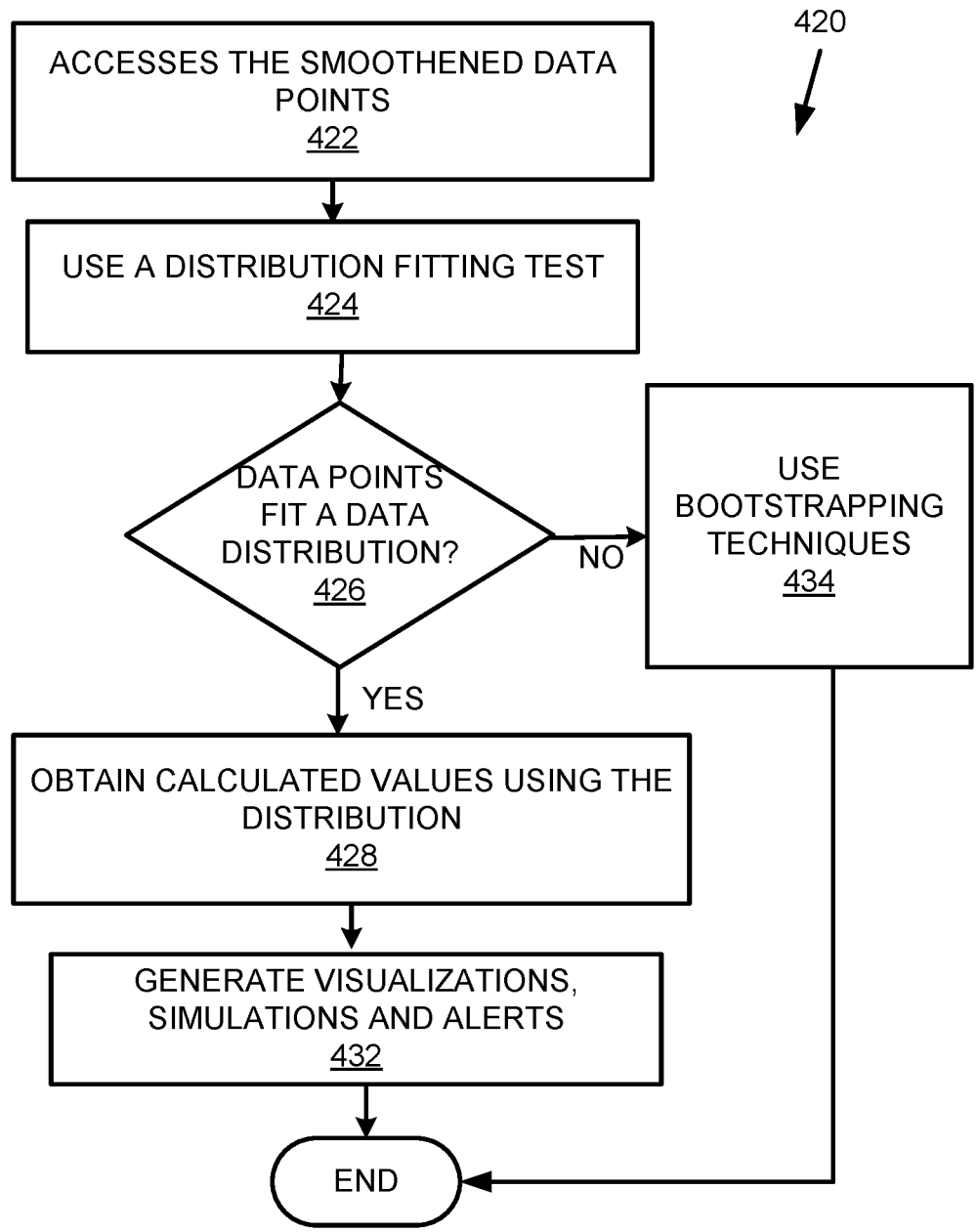

FIG. 4B shows a flowchart 420 that details a method of processing a collection of intermittent data points in accordance with the examples disclosed herein. More particularly, the flowchart 420 details a method executed by one or more of the distribution identifier 304 and the bootstrapping processor 124. The method begins at 422 wherein the smoothened data or the collection of continuous data points e.g., $154_1$ corresponding to the intermediate data points $152_1$. At 424, the distribution fitting test is used on the collection of continuous data points $154_1$ to fit the collection of continuous data points $154_1$ to one of the plurality of data distributions $156_1 \ldots 156_z$ which can include, without limitation, normal, Poisson, negative binomial or gamma distribution. At 426, it is determined if the collection of continuous data points $154_1$ could fit one of the one of the plurality of data distributions $156_1 \ldots 156_z$. If it is determined at 426 that one of the plurality of data distributions $156_1 \ldots 156_z$ fits the collection of continuous data points $154_1$ then one or more calculated values are obtained at 428 by using the data distribution that fit the collection of continuous data points $154_1$. If it is determined at 426 that one of the plurality of data distributions $156_1 \ldots 156_z$ fits the collection of continuous data points $154_1$, then that data distribution can be employed to obtain the calculated values. The calculated values are used at 432 to provide visualizations to the users and for generating simulations enable verifying the accuracy of the calculated values. In a further example, the calculated values can be compared to the historical values and alerts can be transmitted if the calculated values do not meet the historical thresholds. If at 426 it is determined that none of the plurality of data distributions $156_1 \ldots 156_z$ fits the collection of continuous data points $154_1$ then bootstrapping techniques are employed at 434. In an example, both data distribution fitting and bootstrapping techniques can be employed together to obtain more accurate results. Thus, the distribution fitting test is initially applied to the collection of continuous data points $154_1$ and the collection of continuous data points $154_1$ can be bootstrapped to the data distribution that is output by the distribution fitting test as a best fit for the collection of continuous data points $154_1$.

Figure 4C:
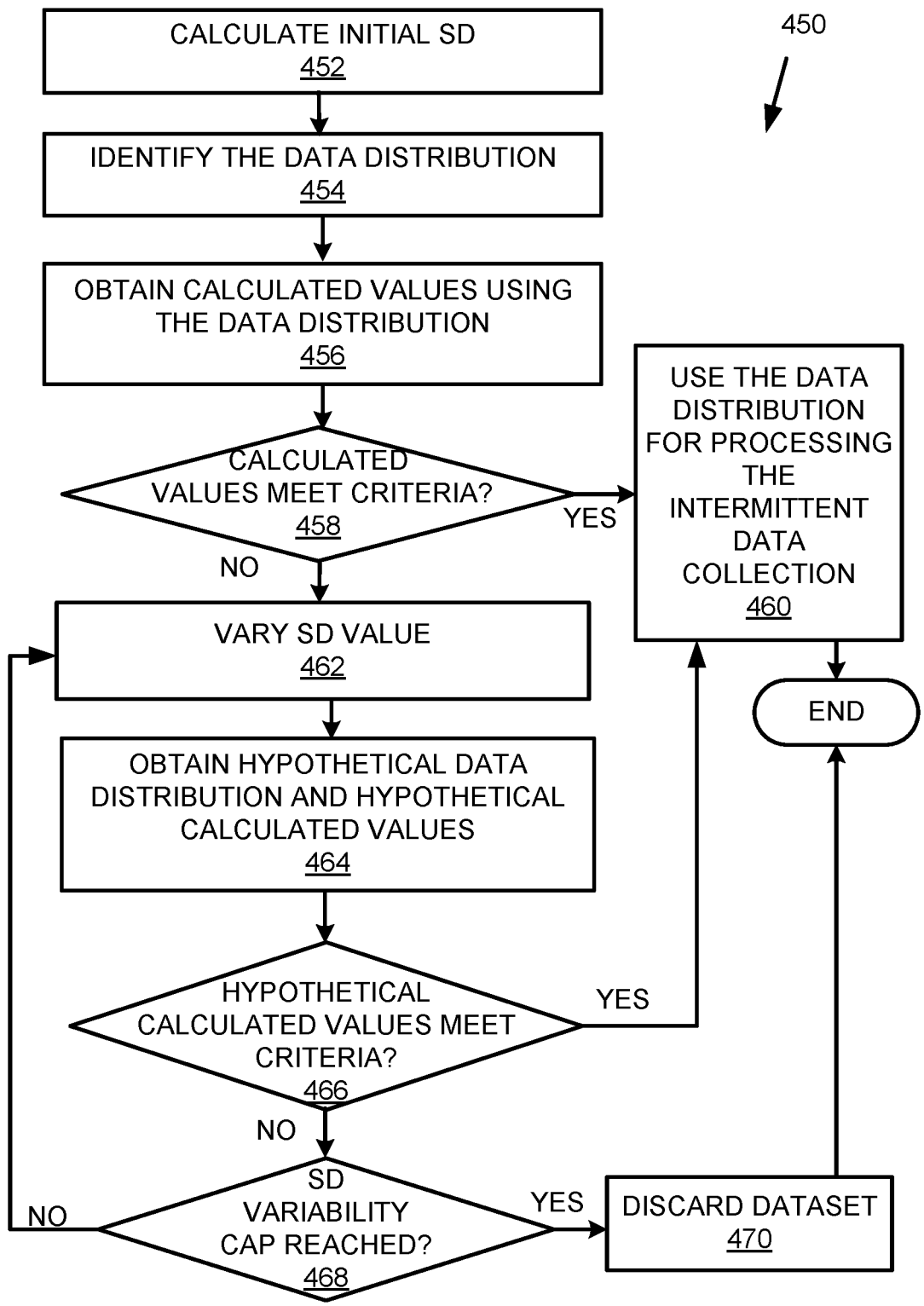

FIG. 4C shows a flowchart 450 of a methodology of fitting an intermittent data collection to a data distribution in accordance with the examples disclosed herein. The method begins at 452 wherein the initial standard deviation is calculated for the collection of continuous data points $154_1$. The data distribution that can be fitted to the collection of continuous data points $154_1$ can be identified at 454 using the distribution fitting test. The data distribution thus identified is used to obtain the calculated values at 456. At 458, it is determined if the calculated values meet certain criteria. The criteria can be associated with the particular use case scenario. For example, referring to the inventory optimization being discussed herein, it is determined at 456 if the calculated values meet the SLA norms. If it is determined at 458 that the calculated values meet the criteria, the method moves to 460 wherein the data distribution output by the distribution fitting test at 454 is used for further processing of the continuous data points $154_1$ in accordance with the examples disclosed herein.

If at 458, it is determined that the calculated values do not meet the criteria, the SD value is varied at 462 as detailed herein based on a predetermined increments e.g., 10% etc. At 464, a hypothetical data distribution and hypothetical calculated values based on the hypothetical data distribution are obtained. In an example, a combination of the SD and the mean of the intermittent or continuous data elements can be used to obtain the hypothetical data distribution. For example, if the data distribution is normal then about 68 percent of the data values are within one SD of the mean (i.e., $\mu \pm \sigma$), about 95% of the data values are within two standard deviations ($\mu \pm 2\sigma$) etc.

It is again determined at 466 if the hypothetical calculated values meet the criteria 466 in a process similar to the step 458. If it is determined at 466 that the hypothetical calculated values meet the criteria, then the method moves to 460 wherein the hypothetical data distribution is used for further processing of the collection of continuous data points $154_1$ in accordance with the examples disclosed herein. If it is determined at 466 that the hypothetical calculated values do not meet the criteria, then the method moves to 468 wherein it is determined if the SD has reached the variability capping limit. If the variability capping limit has not been reached, the method returns to 458 to vary the SD by the next increment. If at 468, it is determined if the SD has reached then the dataset or the collection of continuous data points $154_1$ is discarded as shown at 470 and the process terminates on the end block. The method 450 is thus iteratively executed while varying the SD value incrementally until an optimal SD value and the corresponding data distribution based on which the calculated values meet the criteria are identified.

Various use cases can employ different techniques in determining if the calculated values meet the criteria. In the inventory optimization example, the various calculated values such as the safety stock, ROP, ROQ values can be plugged into the prior demand data. The resulting inventory norms are compared to the SLA norms to determine if the inventory norms meet the SLA. If yes, then the corresponding SD value is taken as the optimal SD value and the calculated values e.g., the safety stock, the ROP, ROQ etc. are incorporated into the SLA. If the inventory norms do not meet the SLA then another hypothetical SD value is obtained.

Figure 5:
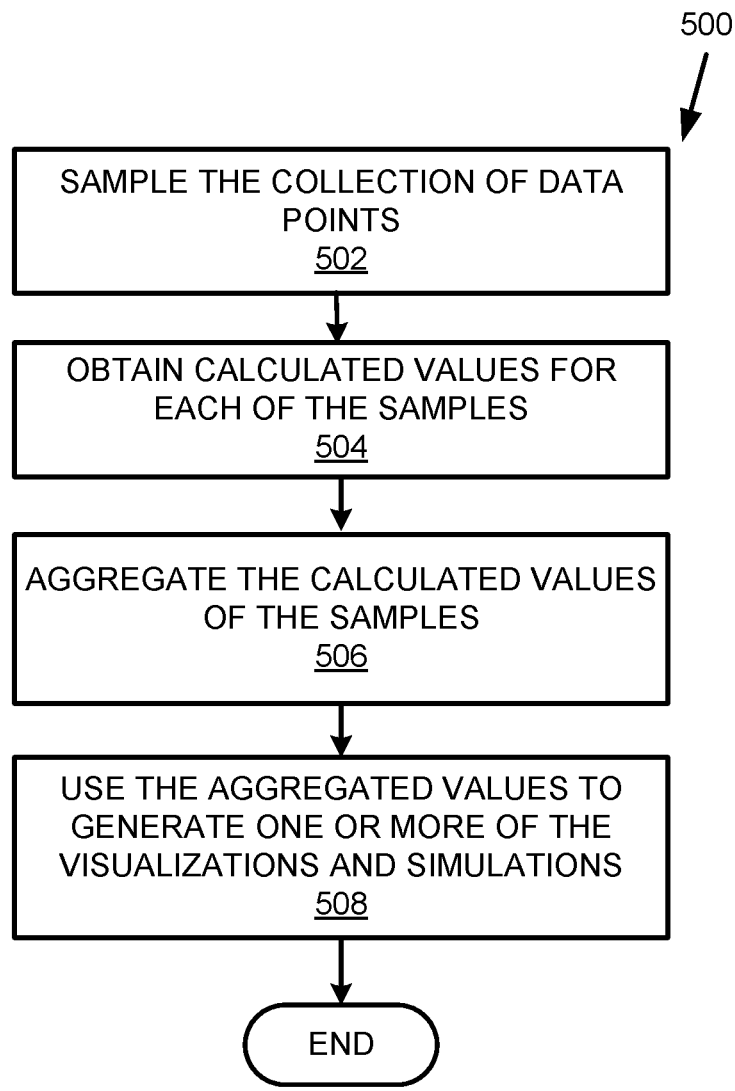
FIG. 5 shows a flowchart that details a method of applying the bootstrapping techniques in accordance with the examples disclosed herein.

FIG. 5 shows a flowchart 500 that details a method of applying the bootstrapping techniques to obtain the calculated values in accordance with the examples disclosed herein. The collection of continuous data points $154_1$ can be initially sampled so that a plurality of data point samples are created at 502. The calculated values are obtained for each of the samples at 504 using a default distribution. One of the plurality of data distributions $156_1 \ldots 156_z$ is used as a default distribution at 504. In an example, Poisson distribution can be set as a default distribution for bootstrapping as generally the intermittent data points follow Poisson distribution. However, other distributions may also be set as default distributions for obtaining the calculated values at 504 in accordance with some examples. The calculated values obtained at 504 for each of the samples are aggregated at 506. The aggregated calculated values used to generate the visualizations and/or data trend simulations as shown at 508.

When the data being analyzed pertains to inventory data which can include intermittent demand data of products, the demand data may be aggregated into monthly or yearly basis depending on the number of data points in the collection prior to being tested for determining the data distribution. So a collection of intermittent data points having less than six points for example, can be aggregated on a yearly basis and a standard deviation is obtained. A collection of intermittent data points having more than six points for example, can be aggregated on a monthly basis and a standard deviation is obtained. Generally, it is desirable that the standard deviation lies within a range of 10% to 250% in order that the simulation generate projections that meet service level agreement (SLA) norms. However, a standard deviation of 10%-400% is also acceptable. In case it is determined that the simulated projections do not meet the SLA norms, the standard deviation can be recalculated and the steps of testing, determining a data distribution and obtaining the calculated values can be repeated until the simulated projections that meet the SLA norms are obtained. The accuracy of the calculated values can be thus be verified based on the compliance of the simulations with one or more rules as codified in the SLA.

Figure 6:
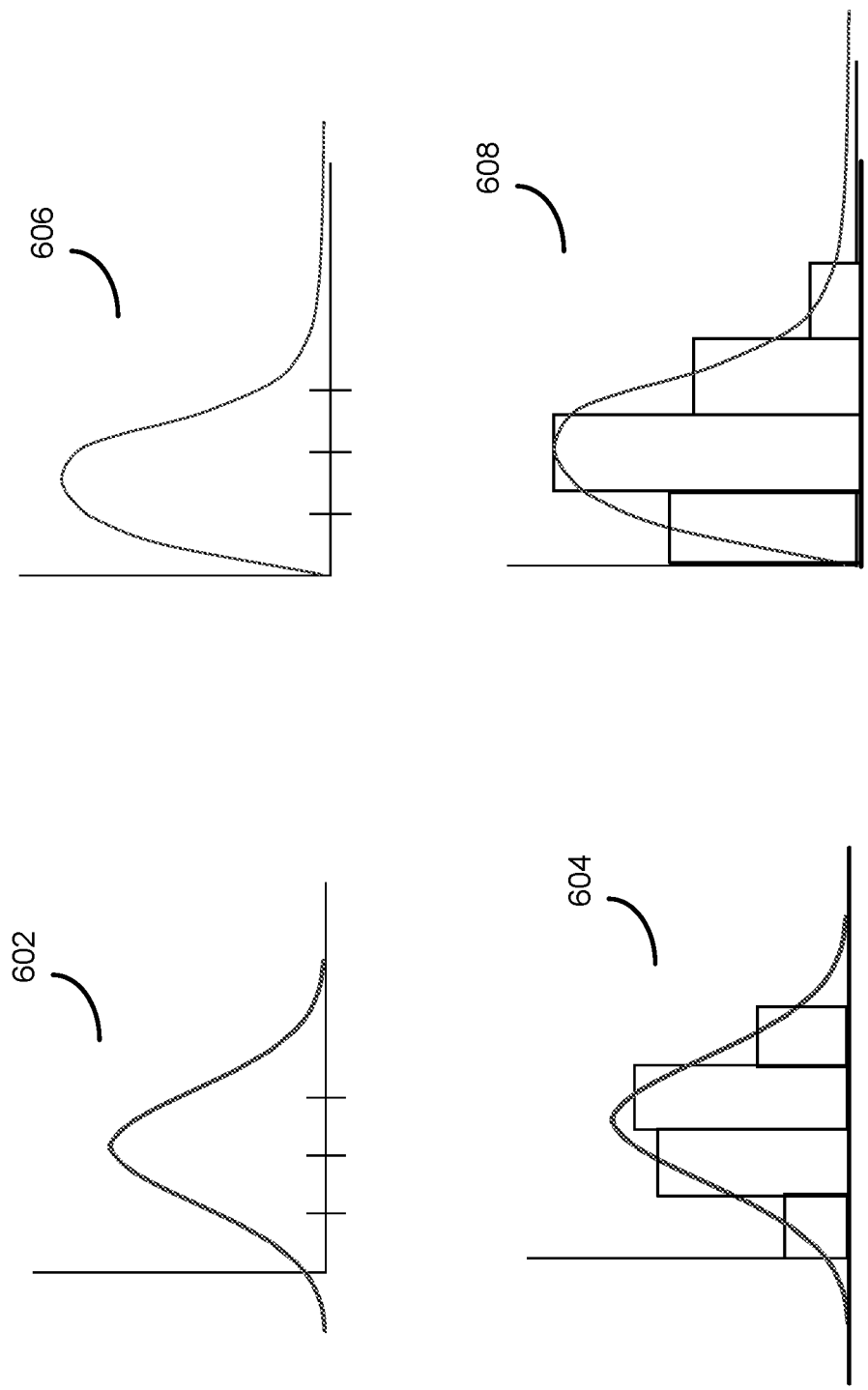
FIG. 6 shows application of a distribution fitting test to a collection of data points in accordance with the examples disclosed herein.

FIG. 6 shows graphs 602, 604, 606 and 608 that illustrate determining a data distribution that fits a given collection of data points. The graphs 602 and 604 pertain to expected normal distribution and expected normal counts for demand data which includes weekly demand event (on the X axis) and the number of times a demand event has occurred (on the Y axis). Similarly, the graphs 606 and 608 pertain to expected Poisson distribution and expected Poisson counts respectively. Expected monthly demands events are calculated from the graphs 602, 604, 606 and 608. The actual counts for each bucket or interval are also counted. The Chi square equation for each theoretical distribution is compared to the actual histogram. The equation is as follows:

$$x^2 = \sum_{i=1}^{k} \frac{(O_i - E_i)^2}{E_i}$$

$O_i$ = The observed frequency for bin $i$.

$E_i$ = The expected frequency for bin $i$.

$k$ = The number of bins (4)

The distribution with the lower of the two Chi-square statistics is chosen as this represents the curve which has the smaller weighted differences between the actual and the expected values.

Figure 7:
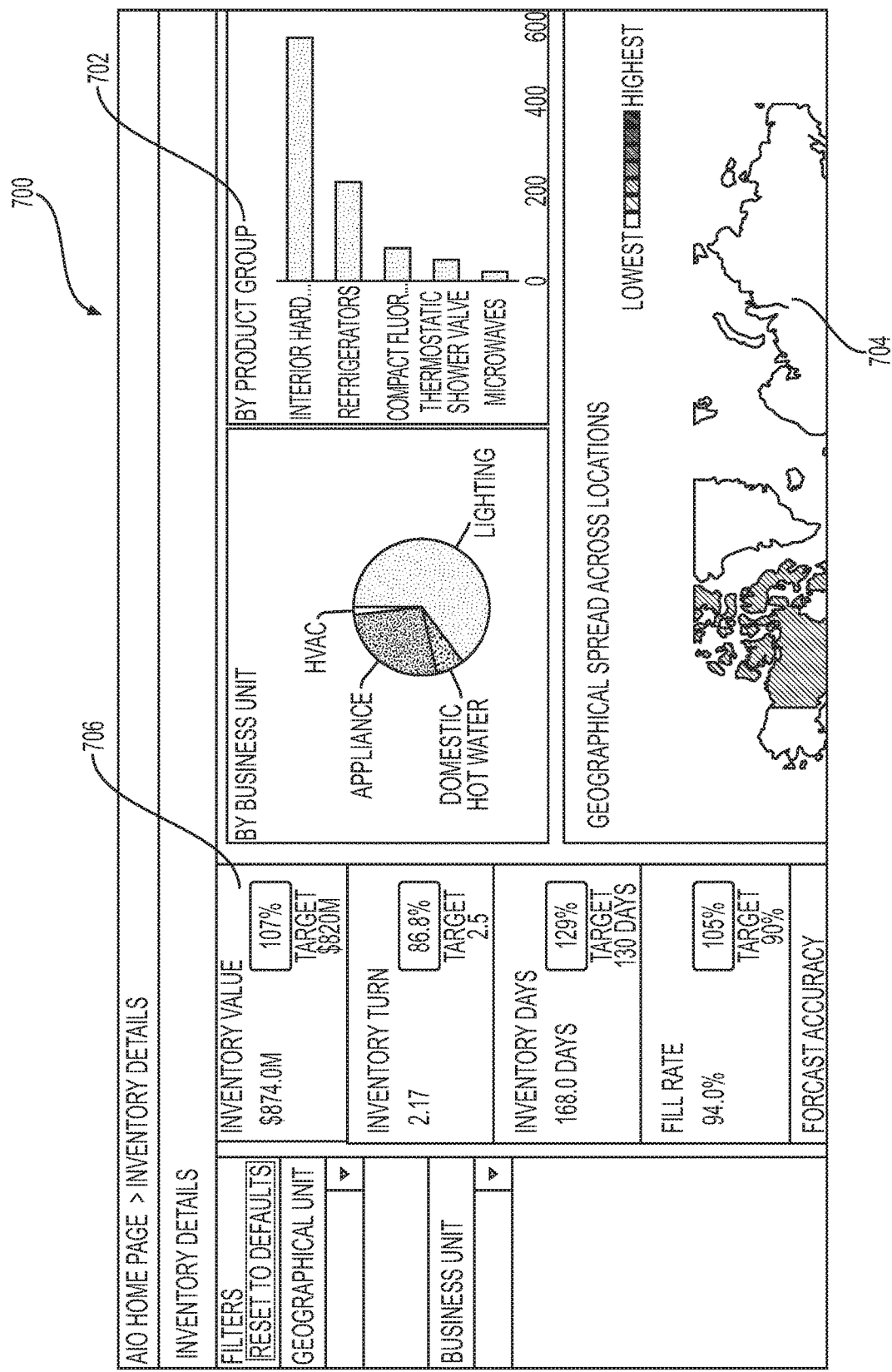
FIG. 7 shows a dashboard that is generated for the collections of data points in accordance with the examples shown herein.

FIG. 7 shows a dashboard 700 that is generated for the collections of data points pertain to inventory data which includes a demand data set and calculated values obtained from the demand data set in accordance with the examples disclosed herein. The inventory data can also include demand-supply variabilities, service level norms and segmentation. The dashboard 700 displays data for a product group 702 that includes refrigerators, thermostatic shower values, microwaves etc. that have intermittent demand. The SKU-location combination of the products is displayed as the geographical spread across the various locations 704. Various inventory attributes 706 such as, but not limited to, the inventory value, inventory days, fill rate etc. are also shown.

Figure 8:
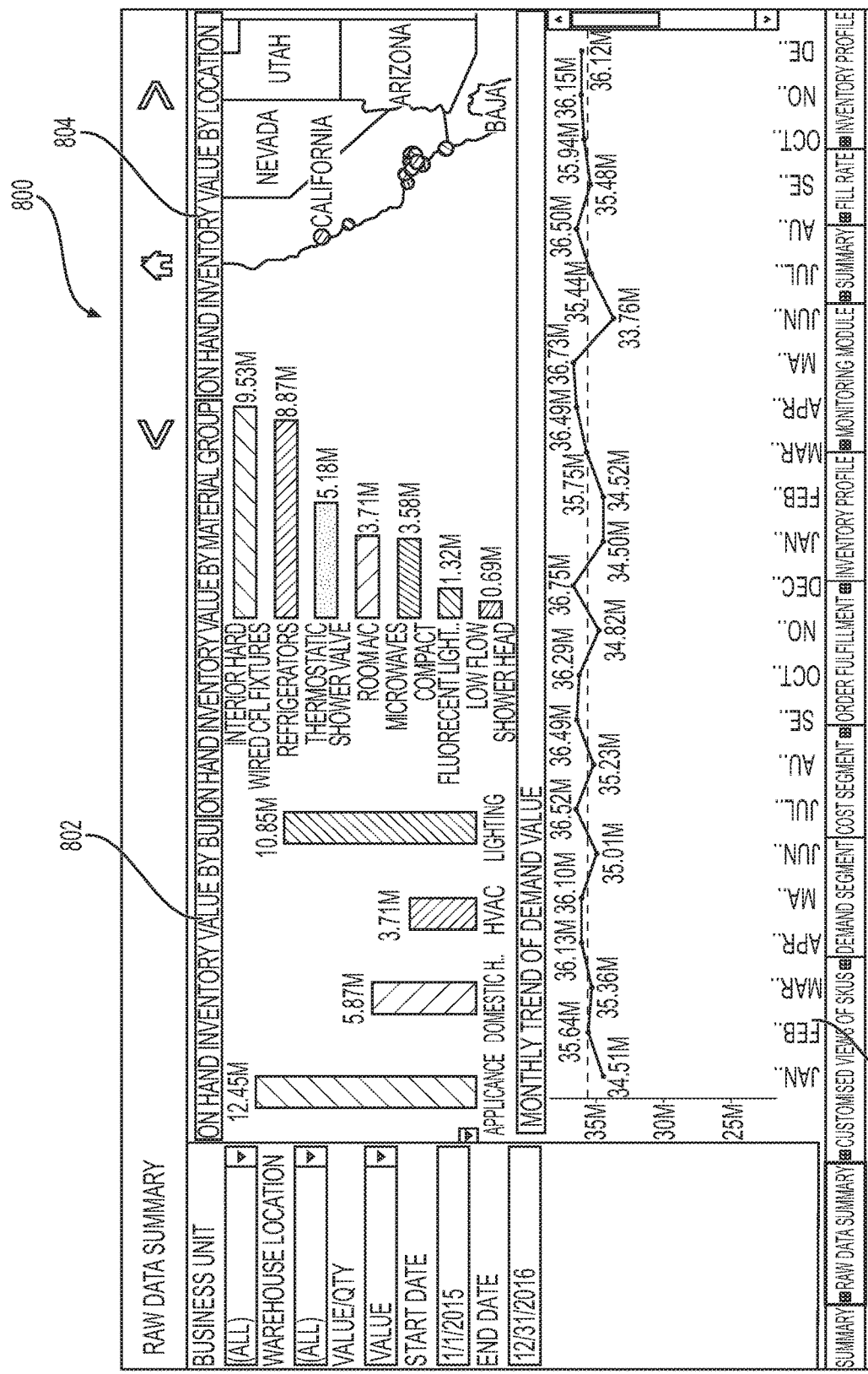
FIG. 8 shows a visualization that is generated for a demand data set in accordance with the examples shown herein.

FIG. 8 shows a visualization 800 that is generated for a demand data set in accordance with the examples shown herein. It includes various panels to show current inventory numbers such as on-hand inventory value by business units 802, on-hand inventory value by material group 804 and a monthly trend of demand value 806. In addition, the visualization 800 enables the users to apply filters 808 for business units, warehouse locations, values/quantities, start and end dates and the like. Thus, the dashboards and other visualizations presented herein address the problems of low visibility of inventory of raw materials, finished goods, rising costs and locking up of working capital due to rising inventory levels, more than acceptable stock outs in some products and more than acceptable inventory pile ups of other products. Insights from dashboards and other visualizations disclosed herein provide visibility to current SKU wise inventory status and enable recommendations on when to order, how much to order and what inventory levels to maintain based on previous demand data trends via the calculations of ROP, ROQ, average inventory, minimum inventory level and maximum inventory level values and the simulations.

The intermittent data processing system 100 when used for inventory optimization employs advanced statistical and simulation techniques such as the Croston method, Anderson Darling Test, Chi-Square test, Normal/Poisson/Negative Binomial/Gamma/distribution free approaches through the bootstrapping algorithm coupled with outlier correction and treatment techniques to generate the insights and visualizations. As a result, inventory monitoring is eased by accurate and insightful visualization of as-in inventory status which increases the visibility of the inventory thereby enabling better supply planning for the companies. The inventory optimization system implementing the ML based methodologies disclosed herein can be used for raw material planning, finished product inventory planning, spare parts inventory planning and the like. For example, the calculated values can include safety stock recommendations, ROP, ROQ recommendations, visualizations of the current max-min with the recommended max-min. The calculated values enable inventory simulations to create an annual ledger with the calculated inventory norms to calculate operations metrics such as fill rate, safety stock hit rate, out of stock metric and compare these with the set/expected targets (SLA norms). Sensitivity analysis for different output metrics such as days of inventory, inventory reductions, fill rate, cycle and max stock and the like are also enabled.

Figure 9:
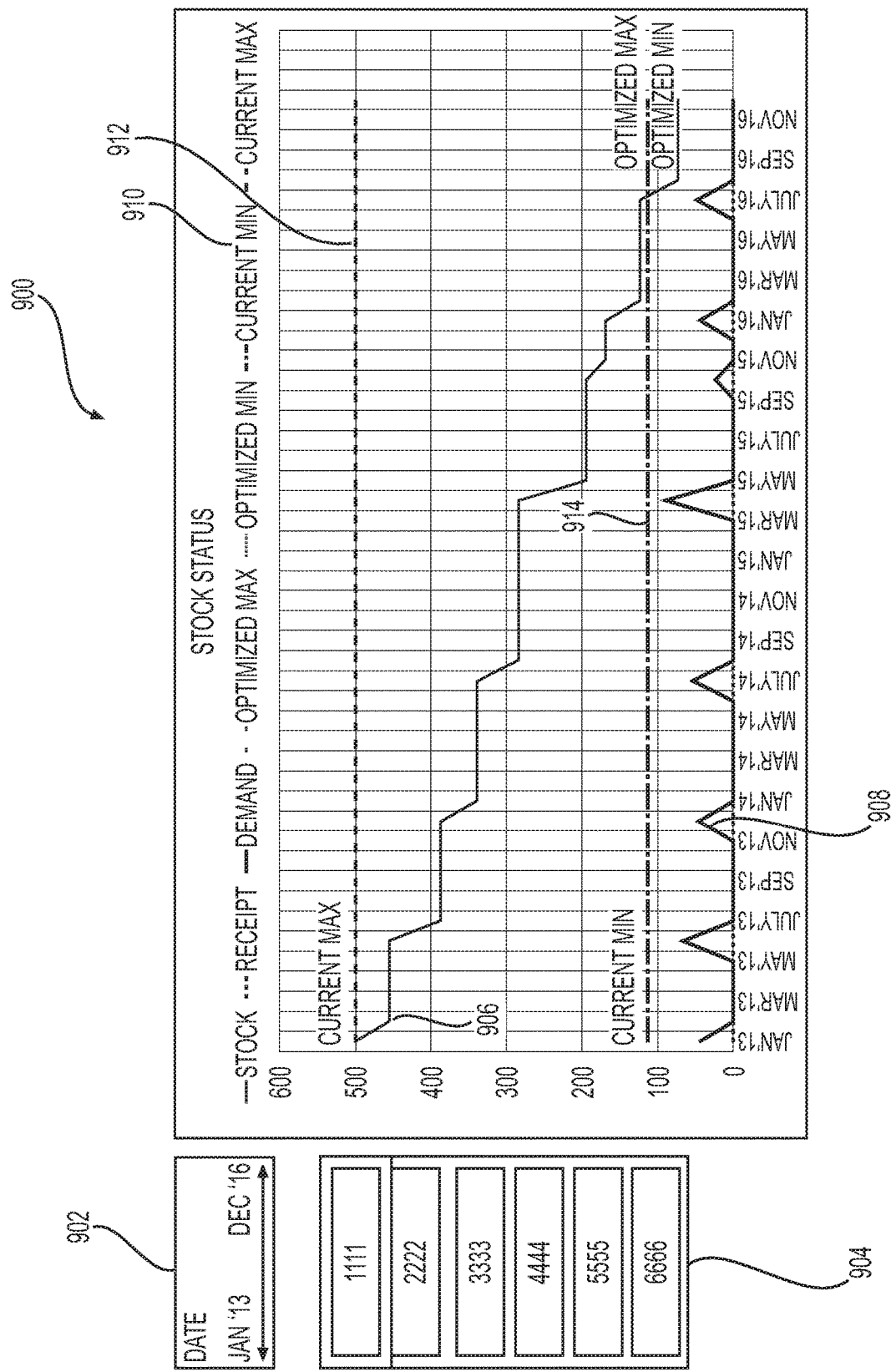
FIG. 9 shows an output user interface that is generated for a demand data set in accordance with the examples shown herein.

FIG. 9 shows an output user interface 900 pertaining to the inventory optimization example is shown herein. The output UI 900 includes various calculated values and simulations generated in accordance with the examples disclosed herein. The date range 902 is initially selected along with the material 904 for which the user desires to view the calculated values. The curve 906 corresponds to the stock movement, the line 908 corresponds to the intermittent demand data of the product selected at 904. As seen from the line 908, the product has intermittent demand but moves very fast from the inventory. The line 912 shows the current min and max values of the inventory while the line 914 shows the min and max values suggested by the inventory optimization process as detailed herein. A legend 910 that explains various graphs shown in the output UI 900 is also included. From the output UI 900, it can be appreciated that when the current stock levels as indicated by the curve 906 goes above or below the recommended min, max values as indicated by the line 914, the inventory optimization system can be configured to send alerts automatically to the responsible parties.

Figure 10:
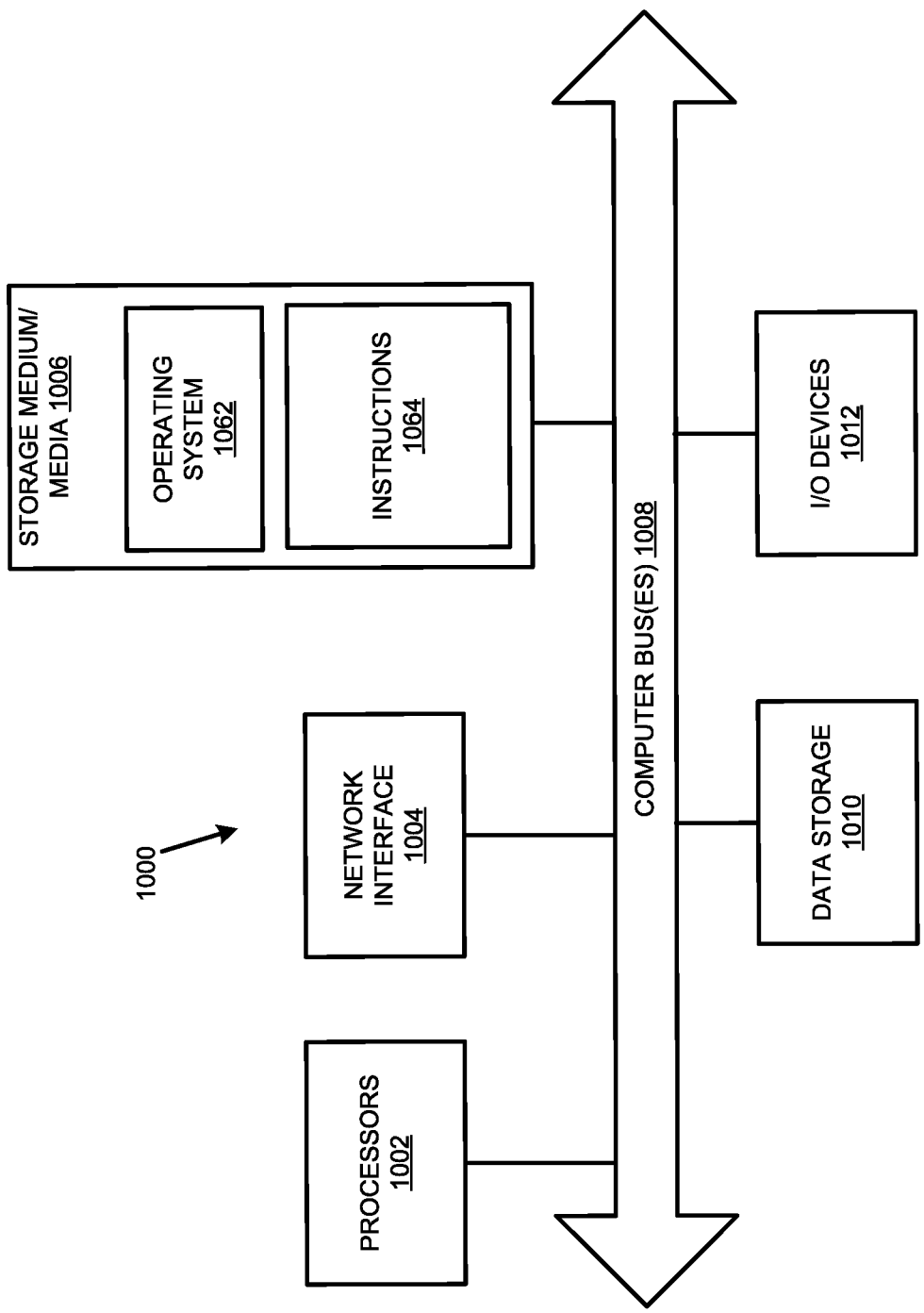
FIG. 10 illustrates a computer system that may be used to implement the intermittent data processing system in accordance with examples disclosed herein.

FIG. 10 illustrates a computer system 1000 that may be used to implement the intermittent data processing system 100 or an inventory optimization system as disclosed herein. More particularly, computing machines such as desktops, laptops, smartphones, tablets and wearables which may be used to generate or access the data from the intermittent data processing system 100 may have the structure of the computer system 1000. The computer system 1000 may include additional components not shown and that some of the components described may be removed and/or modified. In another example, a computer system 1000 can sit on external-cloud platforms such as, Amazon Web Services, or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the computer-readable medium 1006 may be non-transitory or non-volatile medium, such as a magnetic disk or solid-state non-volatile memory or volatile medium such as RAM. The instructions or modules stored on the computer-readable medium 1006 may include machine-readable instructions 1064 executed by the processor(s) 1002 to perform the methods and functions of the intermittent data processing system 100.

The intermittent data processing system 100 may be implemented as software stored on a non-transitory computer-readable medium and executed by the one or more processors 1002. For example, the computer-readable medium 1006 may store an operating system 1062, such as MAC OS, MS WINDOWS, UNIX, or LINUX, and code 1064 for the intermittent data processing system 100. The operating system 1062 may be multi-user, multiprocessing, multitasking, multithreading, real-time and the like. For example, during runtime, the operating system 1062 is running and the code for the intermittent data processing system 100 is executed by the processor(s) 1002.

The computer system 1000 may include a data storage 1010, which may include non-volatile data storage. The data storage 1010 stores any data used by the intermittent data processing system 100. The data storage 1010 may be used to store the collections of intermittent data, collections of continuous data, calculated values and the like.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A machine learning (ML)-based intermittent data processing system comprising:
   at least one processor;
   a non-transitory computer readable medium storing machine-readable instructions that cause the at least one processor to:
   access a collection of intermittent data points selected from a plurality of data sources;
   determine a number of data points in the collection of intermittent data points;
   apply a distribution fitting test to the collection of intermittent data points;
   select one of a plurality of data distributions to be fitted to the collection of intermittent data points based on a result of the distribution fitting test;
   apply bootstrapping technique for processing of the collection of intermittent data points if the distribution fitting test fails;
   apply variability capping technique if one or more calculated values from the selected data distribution or the bootstrapping technique do not meet certain criteria through simulations;
   generate one or more simulations that enable determining if at least one calculated value meets certain criteria; and
   transmit at least one alert to a user based on the at least one calculated value.

2. The intermittent data processing system of claim 1, further comprising instructions that cause the at least one processor to:
   smoothen the collection of intermittent data points wherein the collection of intermittent data points is transformed into a collection of continuous data points.

3. The intermittent data processing system of claim 2, the instructions for smoothening the collection of intermittent data points further comprising instructions that cause the at least one processor to:
   smoothen the collection of intermittent data points by employing Croston method.

4. The intermittent data processing system of claim 2, wherein the instructions to smoothen the collection of intermittent data points further comprise instructions that cause the at least one processor to:
   execute outlier correction by one of Sigma, Inter Quartile Ranges (IQR) and Cook's D techniques.

5. The intermittent data processing system of claim 1, wherein the plurality of data distributions include normal distribution, Poisson distribution, negative binomial distribution and gamma distribution.

6. The intermittent data processing system of claim 1, wherein the bootstrapping technique binds the collection of intermittent data points to Poisson distribution.

7. The intermittent data processing system of claim 1, wherein the distribution fitting test includes one of a Chi square test, Anderson-Darling test and Artificial Intelligence (AI)-based decision trees.

8. The intermittent data processing system of claim 1, the instructions for applying variability capping technique further comprising instructions that cause the at least one processor to:
obtain a standard deviation (SD) for the collection of intermittent data points.

9. The intermittent data processing system of claim 1, the instructions for applying variability capping technique further comprising instructions that cause the at least one processor to:
generate a calculated SD by varying the SD by a predetermined increment when the at least one calculated value is determined to be inaccurate based on the simulation;
generate a hypothetical data distribution corresponding to the calculated SD; and
obtain the at least one calculated value from the hypothetical data distribution.

10. The intermittent data processing system of claim 9, the instructions for applying variability capping technique further comprising instructions that cause the at least one processor to:
repeat the steps of generating the calculated SD, generating the hypothetical data distribution, obtaining the at least one calculated value and generating the one or more simulations until one of an optimal SD value is identified or a variability capping limit for varying the SD value is reached.

11. The intermittent data processing system of claim 1, comprising further instructions that cause the at least one processor to:
generate a visualization that displays the at least one calculated value.

12. An intermittent demand data processing method comprising:
accessing intermittent demand data including multiple data points pertaining to from one or more demand data sources, the demand data including information regarding one or more of demand-supply variabilities, service level norms and segmentation;
processing the intermittent demand data by smoothening the intermittent demand data to obtain continuous demand data;
determining whether the demand data fits one of a plurality of data distributions based on a distribution fitting test;
employing bootstrapping techniques for determining a data distribution of the demand-supply variabilities;
calculating at least one inventory norm based on the determined data distribution of the demand data;
determining accuracy of the at least one inventory norm based on a simulation from historical data;
employing variability capping techniques if the at least one inventory norm is determined to be inaccurate;
generating one or more visualizations displaying the at least one inventory norm if the at least one inventory norm is determined to be accurate; and
transmitting at least one alert to a user based on the inventory norm if the at least one inventory norm is determined to be accurate.

13. The intermittent demand data processing method of claim 12, further comprising:
fetching the demand data from an enterprise resource planning (ERP) system.

14. The intermittent demand data processing method of claim 13, wherein accessing the demand data further comprises:
storing the demand data in a secure file protocol (SFTP) location for enabling the access.

15. The intermittent demand data processing method of claim 13, wherein processing the demand data further includes:
smoothening the demand data by employing Croston method.

16. The intermittent demand data processing method of claim 12 wherein determining whether the demand data fits one of a plurality of data distributions further includes:
determining that the demand data fits negative binomial distribution wherein the demand data includes sparse data points.

17. The intermittent demand data processing method of claim 12, wherein the at least one inventory norm includes a reorder point (ROP), reorder quantity (ROQ), average inventory, minimum inventory level and maximum inventory level.

18. A non-transitory computer-readable storage medium comprising machine-readable instructions that cause a processor to:
access a collection of intermittent data points selected from a plurality of data sources;
apply a distribution fitting test to the collection of intermittent data points;
select one of a plurality of data distributions to be fitted to the collection of intermittent data points based on a result of the distribution fitting test;
apply bootstrapping technique for processing of the collection of intermittent data points if the distribution fitting test fails;
apply variability capping technique if one or more calculated values from the selected data distribution or the bootstrapping technique do not meet certain criteria through simulations;
generate one or more simulations that enable determining if at least one calculated value meets certain criteria; and
transmit at least one alert to a user based on the at least one calculated value.

19. The non-transitory computer-readable storage medium of claim 18, further comprising machine-readable instructions that cause the processor to:
train AI selection elements on historical data for identifying parameters that enable selection of one of the plurality of data distributions that fit the collection of intermittent data points, the historical data including at least information pertaining to the collection of intermittent data points, the plurality of data distributions and the selected data distribution.

20. The non-transitory computer-readable storage medium of claim 19, wherein the AI selection elements include decision trees.

* * * * *